(12) United States Patent
Koene et al.

(10) Patent No.: US 7,381,235 B2
(45) Date of Patent: Jun. 3, 2008

(54) CYCLONE SEPARATOR, LIQUID COLLECTING BOX AND PRESSURE VESSEL

(75) Inventors: Frédéric Pierre Joseph Koene, Heelsum (NL); Adriaan Bos, Voorschoten (NL)

(73) Assignee: Frederic Pierre Joseph Koene, Heelsum (NL)

( * ) Notice: Subject to any disclaimer, the term of this patent is extended or adjusted under 35 U.S.C. 154(b) by 533 days.

(21) Appl. No.: 10/498,853

(22) PCT Filed: Dec. 12, 2002

(86) PCT No.: PCT/NL02/00822

§ 371 (c)(1), (2), (4) Date: Mar. 7, 2005

(87) PCT Pub. No.: WO03/053590

PCT Pub. Date: Jul. 3, 2003

(65) Prior Publication Data

US 2005/0150200 A1    Jul. 14, 2005

(30) Foreign Application Priority Data

Dec. 13, 2001 (NL) .................................. 1019561

(51) Int. Cl.
*B01D 45/12* (2006.01)
(52) U.S. Cl. .............................. 55/394; 55/452; 55/457
(58) Field of Classification Search .................. 55/394, 55/396, 431, 452, 456, 457
See application file for complete search history.

(56) References Cited

U.S. PATENT DOCUMENTS

| 229,707 | A | * | 6/1880 | Thornton ..................... 55/456 |
| 2,370,629 | A | | 3/1945 | Appeldoorn |
| 4,238,210 | A | | 12/1980 | Regehr et al. |
| 7,279,020 | B2 | * | 10/2007 | Christiansen et al. ......... 55/338 |

FOREIGN PATENT DOCUMENTS

| EP | 1 147 799 A1 | 10/2001 |
| GB | 928386 | 6/1963 |
| GB | 2 157 198 A | 10/1985 |
| WO | WO 00/25931 | 5/2000 |

* cited by examiner

Primary Examiner—Robert A Hopkins

(57) ABSTRACT

A cyclone separator provided with a tube with an axial inflow opening and an axial outflow opening, a stationary swirl body arranged in the tube, designed for imparting a spiraling movement to an axially directed gas liquid flow entering the tube in use, while in the case wall of the tube, a slot has been provided for discharging from the inside space of the tube liquid in the gas/liquid flow thrown outwards, while the slot runs in a spiral-shaped path over the case wall of the tube and/or wherein in the case wall of the tube, downstream of the at least one slot, at least one bypass opening is provided, while means are provided for creating, at the location of the at least one bypass opening, a reduced pressure in the tube relative to the pressure prevailing out-side the tube. The invention also provides a liquid collecting box with such cyclone separator and a pressure vessel provided with such liquid collecting boxes.

17 Claims, 5 Drawing Sheets

CYCLONE SEPARATOR, LIQUID COLLECTING BOX AND PRESSURE VESSEL

This application is the U.S. National Phase of International Application Number PCT/NL02/00822 filed on 12 Dec. 2002, which is incorporated herein by reference.

BACKGROUND OF THE INVENTION

The invention relates to a cyclone separator provided with a tube with an axial inflow opening and an axial outflow opening, a stationary swirl body arranged in the tube, designed for imparting a spiraling movement to an axially directed gas/liquid flow entering the tube, in use, while in the case wall of the tube a slot is provided for discharging from the inner space of the tube liquid in the gas/liquid flow that has been slung radially outwards under the influence of the centrifugal force prevailing in the spiraling flow.

Such a cyclone separator is known from, for instance, NL-C-1016114. In that publication, but also in other publications, the cyclone separator is provided with several slots running in axial direction. Further, the known cyclone is provided with a secondary gas inflow opening provided in the tube case wall, located upstream of the swirl body, which opening is connected via a secondary gas pipe to a chamber in a core of the swirl body, which chamber is provided with a number of secondary gas outflow openings which are preferably located between swirl blades provided on the core of the swirl body. The secondary gas inflow opening and secondary gas outflow openings result in a secondary gas flow which egresses from the tube via the slots and, via the secondary gas inflow opening, the secondary gas duct, the chamber and the secondary gas outflow openings, ends up in the tube again. The purpose of the secondary gas flow is to promote the entrainment of liquid through the slots.

In practice, it appears that not the same amount of secondary gas flows through each slot. As a consequence, the liquid separation varies per slot Moreover, the amount of through-flowing secondary gas per slot varies in time, so that an unstable separation behavior occurs, which is undesired. The quality of the known cyclone separators is determined by the separating efficiency of the least optimally functioning slot of the cyclone separator.

The invention contemplates a cyclone separator without the drawbacks mentioned hereinabove and to that end provides, according to the invention, a cyclone separator of the type described in the opening paragraph, which is characterized in that only one slot is provided, while the slot runs in a spiral-shaped path over the case wall of the tube.

So-called CFD-studies (computer fluid dynamics) as well as experiments in practice have shown that with one spiral-shaped slot a much higher separating efficiency is obtained. Moreover, variation in separating efficiency in time does not occur any longer. As only one spiraling slot is involved, the inner surface of the tube forms an outstanding coalescence surface on which the liquid droplets present in the gas flow precipitate and accumulate to form a liquid film. This liquid film is entrained by the spiraling gas flow to the spiral-shaped slot to exit there. As there is only one slot, in the slot a considerably higher gas outflow velocity prevails than with several slots, so that the liquid is pulled loose from the slot better by the gas flowing through the slot. Thus, a very high separating efficiency is effected.

An optimal separating efficiency is obtained when, according to a further embodiment of the invention, the spiral of the slot rotates clockwise around the central axis of the tube, while, in use, the spiraling gas flow in the tube rotates counter-clockwise around the central axis of the tube, or vice versa.

As a result of the opposite direction of pitch of the slot and of the spiraling flow, the separating efficiency is even more increased. From various CFD-studies it appears that an optimal separation is obtained when, according to a further embodiment of the invention, the spiral-shaped slot extends over substantially 180 degrees around the tube surface, while the pitch angle is preferably in the range of 30-60 degrees, more in particular is approximately 45 degrees.

When no means are present for discharging gas having egressed via the slot, the gas having egressed via the slots will eventually reenter the tube via the slot. The fact is that the tubes of the cyclone separators are connected by their ends to the walls of so-called liquid collecting boxes which, apart from a discharge for liquid, are otherwise closed. Therefore, in such a liquid collecting box, a certain excess pressure will start to prevail, as a result of which the gas having egressed via the slot will tend to reenter the tube via that same slot. This may present a certain danger to the entry of liquid via the slot, which is highly undesired because the very purpose of the cyclone separator is to separate liquid from the gas/liquid flow flowing through the tube. This phenomenon, for that matter, also presents itself in the known cyclones with several axial slots.

SUMMARY OF THE INVENTION

To prevent this phenomenon, according to the invention, a cyclone separator is provided having a tube with an axial inflow opening and an axial outflow opening, a stationary swirl body arranged in the tube, designed for imparting a spiraling movement to an axially directed gas/liquid flow entering the tube in use, while in the case wall of the tube at least one slot is provided for discharging from the inner space of the tube liquid in the gas/liquid flow that has been slung radially outwards under the influence of the centrifugal force prevailing in the spiraling flow, which cyclone separator is characterized in that in the case wall of the tube, downstream of the at least one slot, at least one bypass opening is provided, while on the inside of the tube, means are provided for creating in the tube, at the location of the at least one by-pass opening, a reduced pressure relative to the pressure prevailing outside the tube at the location of the at least one bypass opening.

Therefore, this may be a cyclone separator with a single spiral-shaped slot as described hereinabove; however, also cyclone separators with one or several slots extending, for example in the axial direction of the tube, are comprised.

As a result of the bypass openings and the lower pressure prevailing behind them in the tube, gas egressing via the at least one slot will tend to reenter the tube via the bypass opening. Thus, gas egressing via the slot is prevented from reentering the tube through that same slot. By choosing the position of the bypass opening favorably, for instance not directly downstream of the downstream end of the slot but slightly staggered in tangential direction, liquid can simply be prevented from reentering the tube via the bypass opening.

According to a further elaboration of the invention, the means for creating a reduced pressure can comprise an inner ring arranged upstream of the bypass openings on the inner surface of the case wall, while an inside diameter of the inner ring is smaller than the inside diameter of the tube. Such a ring forms a constriction in the tube serving as a flow channel. Directly downstream of the ring, behind the ring, an area of reduced pressure prevails which causes gas having egressed from the slot to preferentially flow to that area of reduced pressure to reenter the tube.

According to a further elaboration of the invention, the inside diameter of the inner ring is substantially 0.8 of the inside diameter of the tube.

As already noted hereinabove, the distance between the point where the gas has egressed from the slot and the position of the bypass opening is so great that, at the moment when the gas enters via the bypass opening, the chance that liquid is present in the gas is particularly small. To completely preclude liquid still entering the tube via the bypass openings, according to a further elaboration of the invention, entry-prevention means can be provided which are arranged for preventing the liquid from entering from the outside of the tube via the bypass openings into the inside of the tube. According to a further elaboration of the invention, such entry-prevention means can comprise a ring or a collar arranged on the outside surface of the case wall and extending in an imaginary plane intersecting the central axis of the tube perpendicularly, and which is at an axial position between a downstream end of the spiral-shaped slot and upstream of the bypass openings, while the inside diameter of the respective ring or collar corresponds to the outside diameter of the tube. On such a ring or collar, liquid present in the gas which, outside the tube, flows in the direction of the bypass openings, will precipitate before it reaches the bypass openings.

According to an alternative further elaboration of the invention, the entry-prevention means can comprise a collar extending radially outwards around the or each bypass opening. Such a collar too renders the chance that liquid enters into the bypass openings nil.

Instead of, or in addition to, the bypass openings described hereinabove, in a further elaboration of the invention, in the case wall of the tube of the cyclone separator, upstream of the swirl body, a secondary gas inflow opening can be provided to which, on the inside of the tube, a secondary gas pipe is connected which terminates in a chamber arranged in the swirl body, the chamber being provided with at least one secondary gas outflow opening. Thus, differently from the exemplary embodiment described hereinabove, a so-called recirculation cyclone is provided. Also with such a recirculation cyclone, the single spiral-shaped slot yields a much better separating efficiency than the conventional recirculation cyclone with three or six axial slots. Preferably, the swirl body is provided with a number of secondary gas outflow openings arranged upstream of an axial downstream end of the swirl body, preferably between swirl blades provided on the swirl body core. It appears that an optimal separating efficiency is obtained when the secondary gas inflow opening is in the same axial center plane through the tube as the middle of the slot.

The invention also provides a liquid collecting box provided with a number of cyclones according to the invention, while the liquid collecting box is provided with a liquid discharge duct.

Further, the invention provides a pressure vessel provided with an inlet for a gas/liquid flow, a discharge for gas and a discharge for liquid, wherein between the inlet and the discharge for gas a number of liquid collecting boxes according to the invention are arranged, while the liquid discharge ducts of the liquid collecting boxes are in communication with the discharge for liquid in the vessel.

BRIEF DESCRIPTION OF THE DRAWINGS

The invention will be further elucidated on the basis of an exemplary embodiment with reference to the drawing.

DETAILED DESCRIPTION OF THE INVENTION

Figures 1, 2:
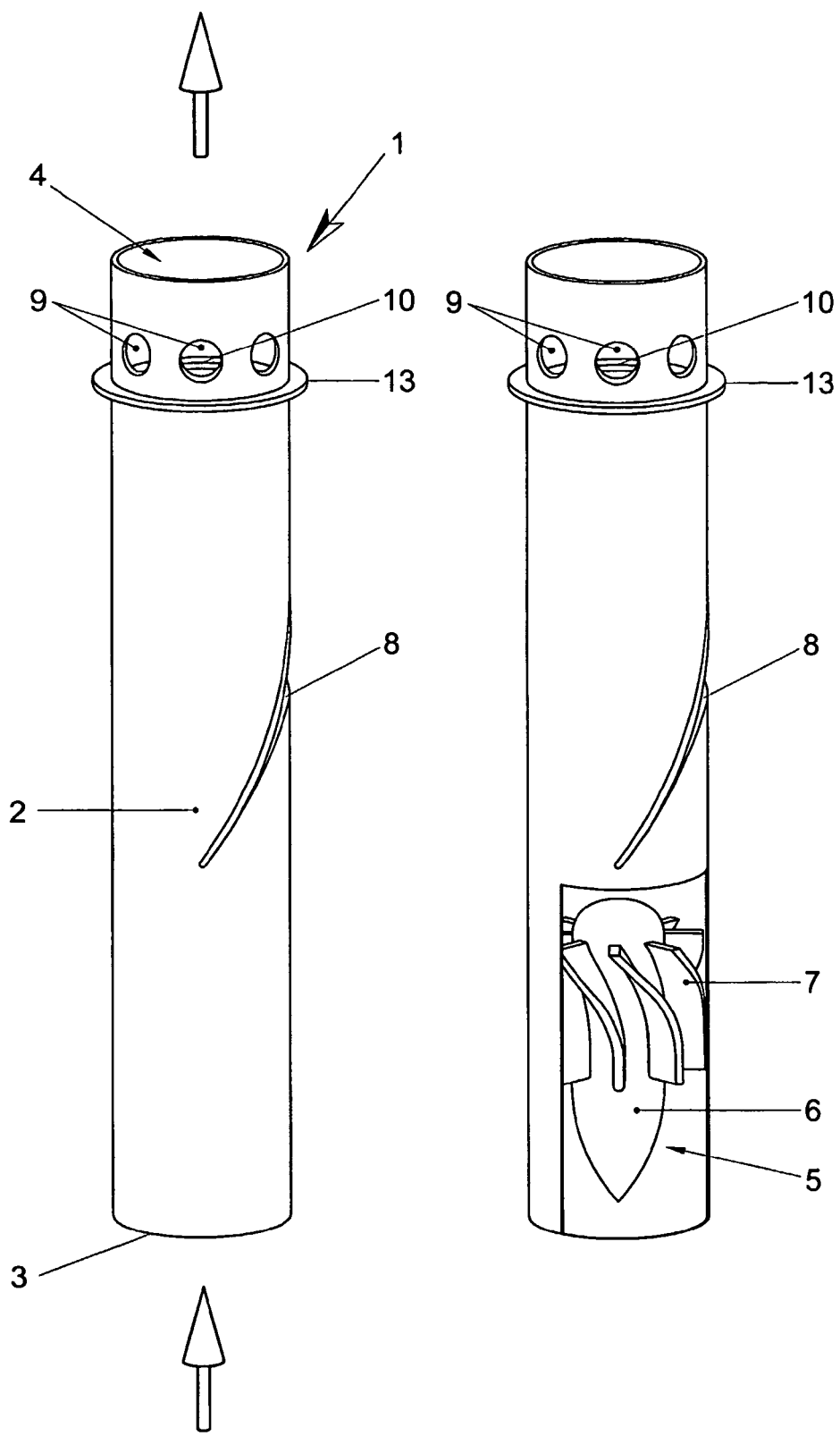
FIG. 1 shows a perspective side view of a cyclone separator.
FIG. 2 shows a similar view which is partly cut away, so that the swirl body is visible.
Figure 3:
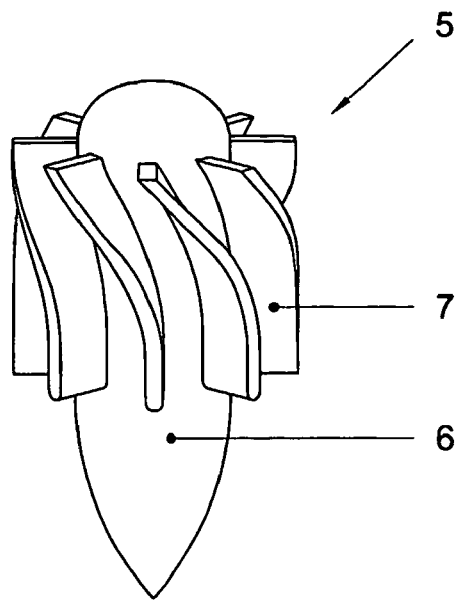
FIG. 3 shows a perspective view of the swirl body.
Figure 4:
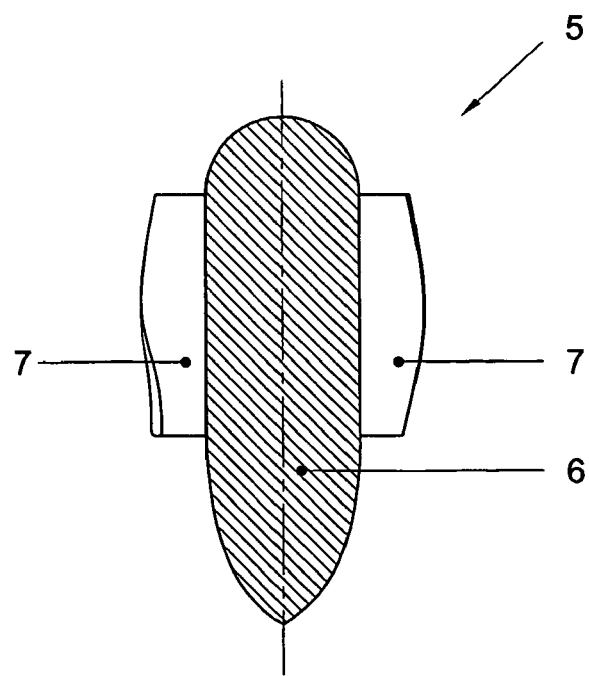
FIG. 4 shows a cross sectional view of the swirl body.

FIGS. 1 and 2 clearly show that the cyclone separator 1 comprises a tube 2, having an axial inflow opening 3 and an axial outflow opening 4. In FIG. 2, in which the bottom side of the tube 2 is partly cut away, it is also clearly visible that in the tube 2, near an upstream end thereof, a swirl body 56 is arranged. The swirl body 5 comprises a core 6 and swirl blades 7. Downstream of the swirl body 5, the tube 2 is provided with a spiral-shaped slot 8. Downstream of a downstream end of the slot 8, a number of bypass openings 9 are provided in the tube 2. Directly upstream of the bypass openings 9, an inner ring 10 is provided on the tube inner side which serves as a constriction for forming an area of reduced pressure in the tube 2 near the bypass openings 9. The gas/liquid flow entering the tube via the axial inflow opening 3 passes the swirl body 5 and is brought into a spiraling movement by the swirl blades 7. As a result of the spiraling movement, a centrifugal force is applied to the liquid droplets present in the gas/liquid flow, which flow causes the liquid droplets to be thrown outwards and to impact the inner wall of the tube 2. So many liquid droplets collect on this tube inner wall that a liquid film will be formed there, which is entrained by the spiraling gas/liquid flow over the tube inside wall until the film reaches the spiral-shaped slot 8 and there will be entrained outside by the gas, also flowing out. Thus a liquid/gas separation occurs and dried gas egresses from the axial outflow opening 4.

Figure 5:
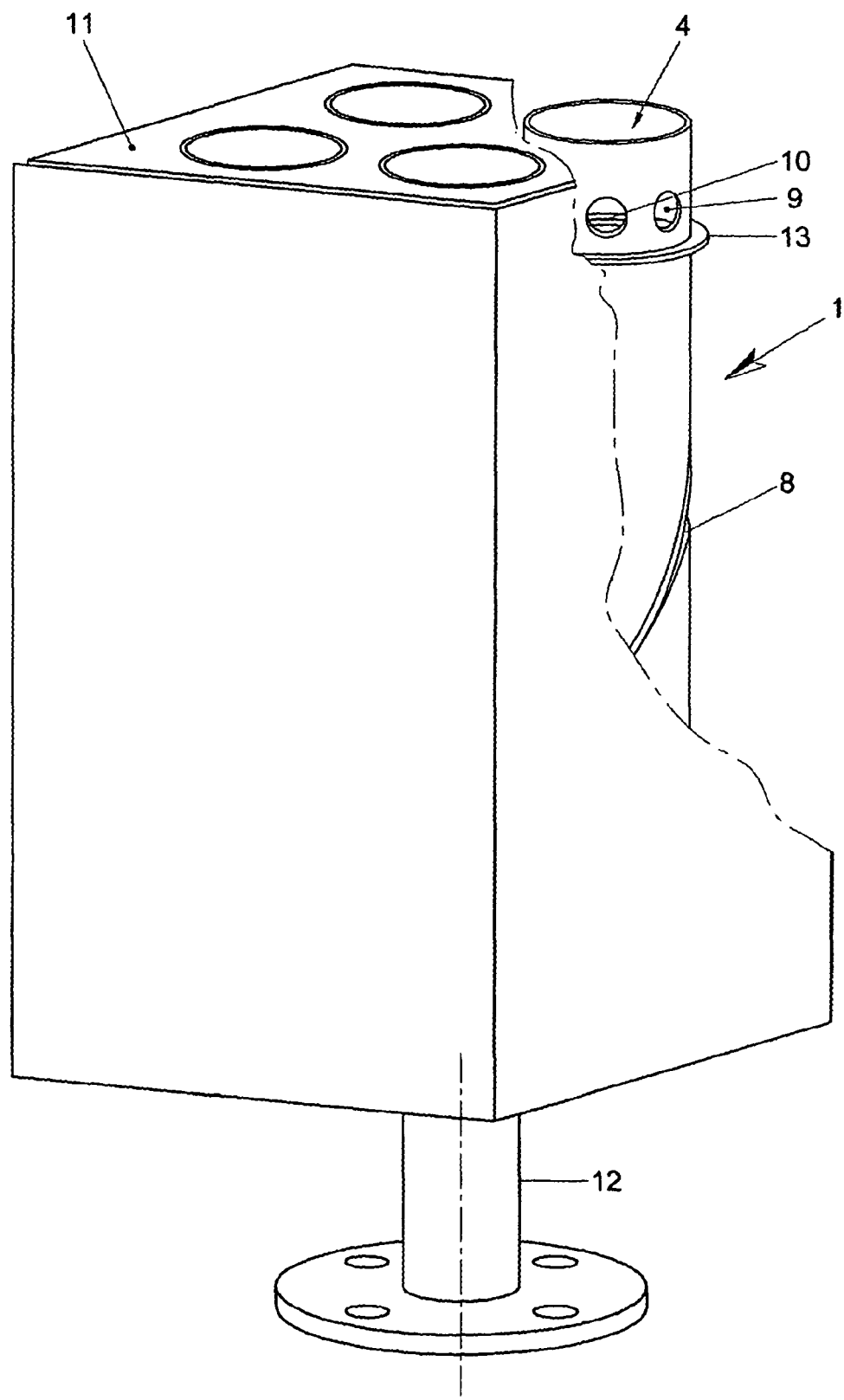
FIG. 5 shows a perspective view of a liquid collecting box which is partly cut away so that one of the cyclone separators is visible therein.

As the cyclone separators 1, as represented in FIG. 5, are arranged in a liquid collecting box 11 which is closed, apart from a liquid discharge 12, the gas having egressed via the slot 8, i.e. gas having entered into the liquid collecting box 11, is forced at a certain moment to reenter the tube 2. The fact is that if this did not occur an enormous excess pressure would start to prevail in the liquid collecting box 11, which excess pressure would prevent gas from egressing through the slot 8. To prevent the gas from reentering the tube 2 via the slot 8, the earlier mentioned bypass openings 9 are provided with the inner ring 10 positioned upstream thereof. Gas egressing via the slot 8 can reenter the tube 2 via the bypass openings 9 in a controlled manner. In the present exemplary embodiment, the tube 2 is provided at the outside with an outer ring 13, present in a plane extending perpendicularly to the central axis of the tube 2 and which is positioned upstream of the bypass openings 9 and downstream of a downstream end of the slot 8. As already noted in the introduction to the specification, instead of such an outer ring 13, also, each bypass opening 9 can be provided with a collar which prevents liquid egressing via the slot from reentering via the bypass openings 9.

Figures 6, 7:
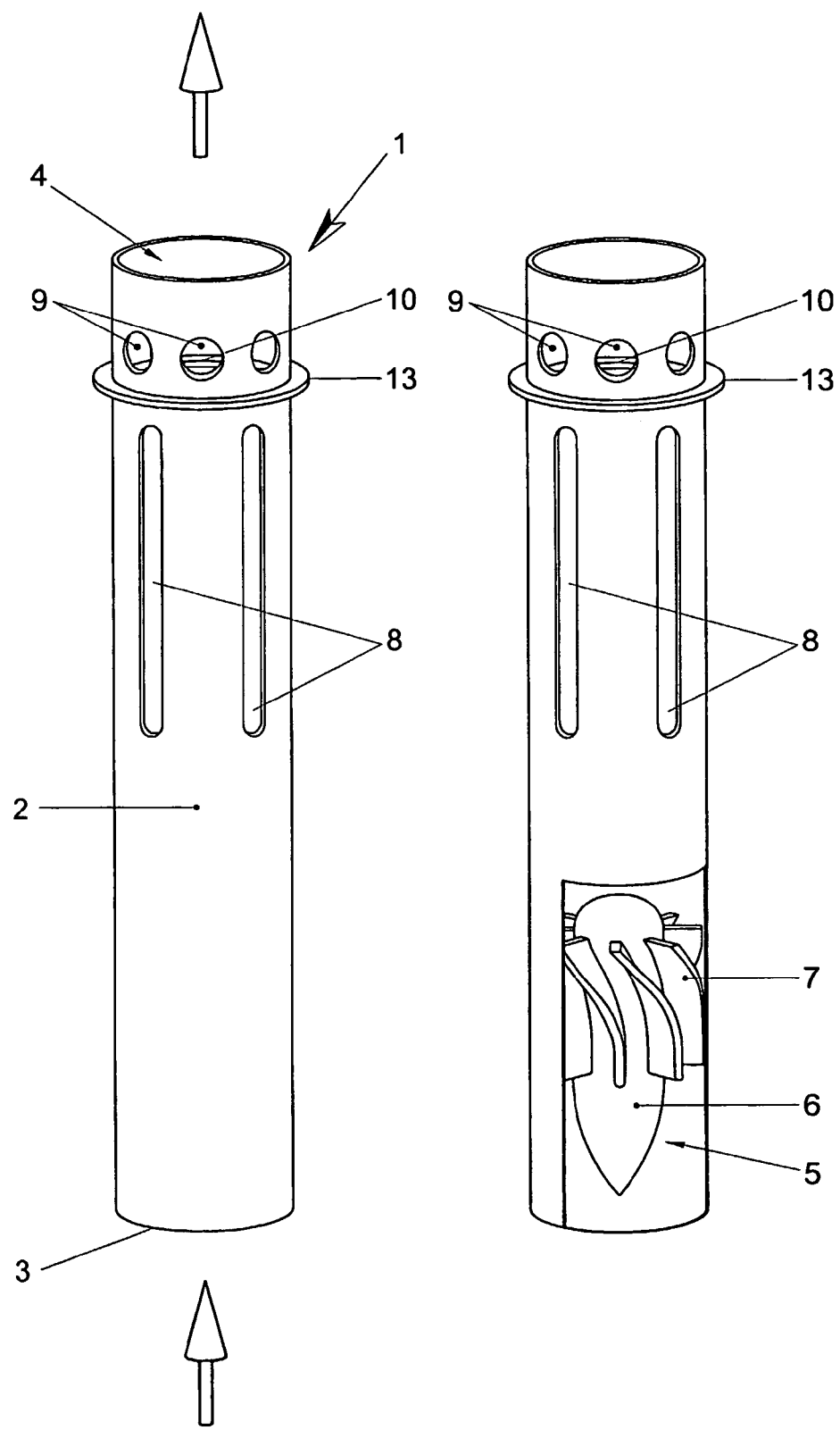
FIGS. 6 and 7 show a second exemplary embodiment of a cyclone separator in similar views to those represented in FIGS. 1 and 2.

FIGS. 6 and 7 show, in similar views to those represented in FIGS. 1 and 2, a second exemplary embodiment of the invention, wherein the cyclone separator is also provided with bypass openings 9, an inner ring 10 and an outer ring 13. From the partly cutaway view of FIG. 7 it appears that the tube 2 also contains a swirl body 5. The exemplary embodiment of FIGS. 6 and 7 is distinguished from the exemplary embodiment of FIGS. 1-2 in that instead of one spiral-shaped slot, a number of slots 8' are provided, extending in longitudinal direction. It will be clear that, in practice, the inner ring 10 and the outer ring 13 can be formed by a single ring. It will further be clear that the invention also comprises elaborations wherein several spiral-shaped or inclined straight slots are provided.

Figure 8:
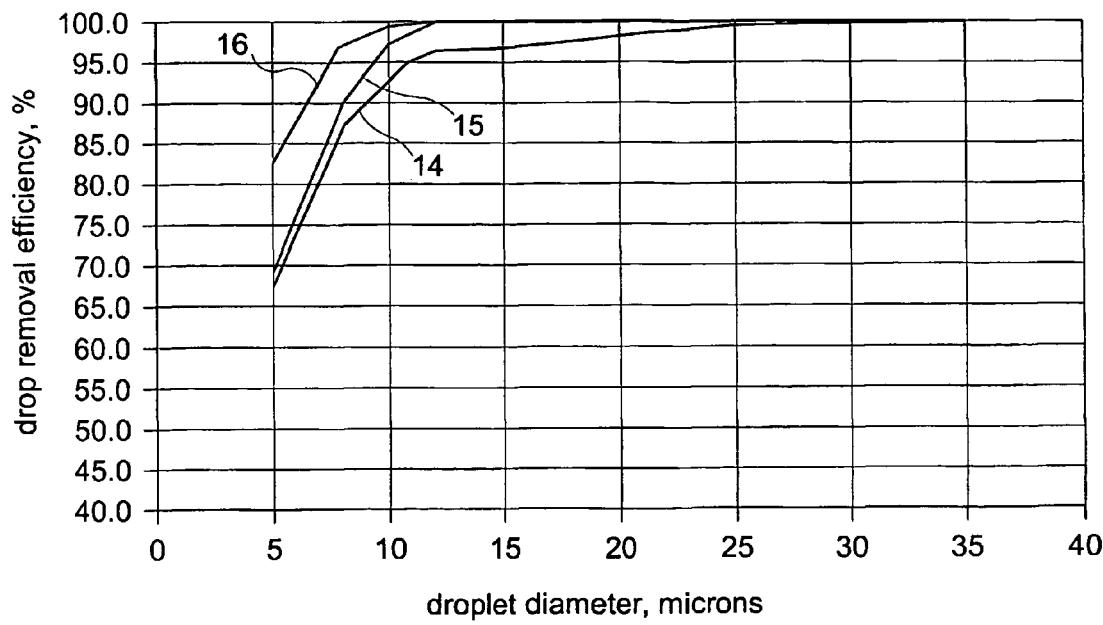
FIG. 8 shows a graph in which the separation efficiency of three recirculation cyclones is represented.

FIG. 8 shows a graph in which horizontally, the liquid drop diameter and vertically, the percentage of drops removed are plotted. Line 14 represents the separating efficiency of an axial recirculation cyclone with three axially directed slots, such as, for instance, described in NIC-1016114. Line 15 represents the separating efficiency of a similar recirculation cyclone, while the secondary gas inflow opening is staggered in tangential direction relative to the exemplary embodiment on the basis of which the line 14 has been determined. Finally, line 16 shows the separating efficiency of a recirculation cyclone provided with one spiral-shaped slot according to the invention. Clearly visible is that line 16 shows the best separating efficiency, so that from the three compared recirculation cyclones, the recirculation cyclone with spiral-shaped slot has the best separating efficiency.

Figure 9:
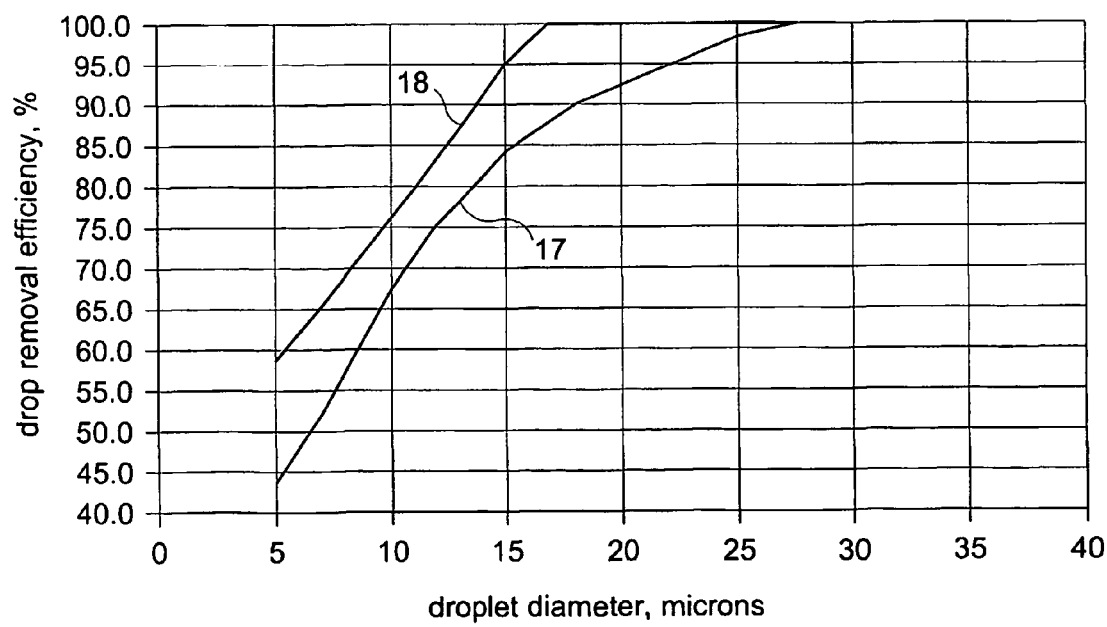
FIG. 9 shows a graph in which the separation efficiency of two non-recirculation cyclones is represented.

FIG. 9 shows a graph in which, horizontally, the liquid drop diameter and, vertically, the percentage of drops removed is plotted. There, line 17 represents the separating efficiency of a cyclone separator without secondary gas inflow opening, secondary gas pipe, chamber and secondary gas outflow opening and with only one axially directed slot. Such a cyclone is not known from the state of the art but is used here as comparative cyclone to demonstrate the effect of the spiral shape of the slot. Line 18 represents the separating efficiency of a similar cyclone separator, wherein, instead of an axial slot, a spiral-shaped slot 8 is provided. Basically, line 18 shows the separating efficiency of a cyclone separator as represented in FIG. 1. Clearly visible is that the separating efficiency of this last embodiment is considerably higher than that of the cyclone with the axially directed slot.

It will be clear that the invention is not limited to the exemplary embodiment shown, but that various modifications are possible within the framework of the invention as defined by the claims. For instance, the invention also comprises a recirculation cyclone as described in NL-C-1016114, the content of which is understood to be incorporated herein, while the axial slots have been replaced by a single spiral-shaped slot.

The invention claimed is:

1. A cyclone separator provided with a tube with an axial inflow opening and an axial outflow opening, a stationary swirl body arranged in the tube, designed for imparting a spiraling movement to an axially directed gas/particles flow entering the tube in use, while in the case wall of the tube, a slot is provided for discharging from the inside of the tube particles in the gas/particles flow that has been slung radially outwards under the influence of the centrifugal force prevailing in the spiraling flow, wherein only one slot is provided, while the slot runs in a spiral-shaped path over the case wall of the tube, characterized in that the particles are liquid particles, wherein downstream of a downstream end of the spiral-shaped slot, at least one bypass opening is provided in the case wall of the tube, while on the inside of the tube, means are provided for creating in the tube, at the location of the at least one bypass opening, a reduced pressure relative to the pressure prevailing outside the tube at the location of the at least one bypass opening.

2. A cyclone separator according to claim 1, wherein the spiral of the slot extends clockwise around the central axis of the tube while, in use, the spiraling gas/liquid flow rotates counterclockwise around the central axis of the tube, or vice versa.

3. A cyclone separator according to claim 1, wherein the spiral-shaped slot extends over substantially 180 degrees around the tube surface.

4. A cyclone separator according to claim 1, wherein the angle of pitch of the spiral-shaped slot is in the range of 30-60 degrees, more in particular is approximately 45 degrees.

5. A cyclone separator according to claim 1, wherein upstream of the swirl body, a secondary gas inflow opening is provided in the case wall of the tube, to which, on the inside of the tube, a secondary gas pipe is connected which terminates in a chamber provided in a core of the swirl body, the chamber being provided with at least one secondary gas outflow opening.

6. A cyclone according to claim 5, wherein the swirl body is provided with a number of secondary gas outflow openings which have been provided upstream of an axially downstream end of the swirl body, preferably between swirl blades provided on the core of the swirl body.

7. A cyclone separator according to claim 5, wherein the secondary gas inflow opening lies in the same axial center plane through the tube as the center of the slot.

8. A liquid collecting box provided with a number of cyclones according to claim 1, wherein the liquid collecting box is provided with a liquid discharge duct.

9. A pressure vessel provided with an inlet for a gas/liquid flow and a discharge for gas and a discharge for liquid, while between the inlet and the discharge for gas, a number of liquid collecting boxes according to claim 8 are arranged, while the liquid discharge ducts of the liquid collecting boxes are in communication with the discharge for liquid in the vessel.

10. A cyclone separator provided with a tube with an axial inflow opening and an axial outflow opening, a stationary swirl body arranged in the tube, arranged for imparting a spiraling movement to an axially directed gas/liquid flow entering the tube in use, while in the case wall of the tube at least one slot is arranged for discharging from the inner space of the tube liquid in the gas/liquid flow that has been slung radially outwards under the influence of the centrifugal force prevailing in the spiraling flow, characterized in that in the case wall of the tube, downstream of the at least at least one slot, at least one bypass opening is provided, while on the inside of the tube means are provided for creating in the tube, at the location of the at least one bypass opening, a reduced pressure relative to the pressure prevailing outside the tube at the location of the at least one bypass opening.

11. A cyclone separator according to claim 10 wherein the means for creating a reduced pressure comprise an inner ring which is provide upstream of the bypass openings on the inside surface of the case wall, while an inside diameter of the inner ring is smaller than the inside diameter of the tube.

12. A cyclone separator according to claim 11, wherein the inside diameter of the inner ring is 0.8 of the inside diameter of the tube.

13. A cyclone separator according to claim 10, wherein entry-prevention means are provided, designed for preventing the liquid from reentering from the outside of the tube via the bypass openings to the inside of the tube.

14. A cyclone separator according to claim 13, wherein the entry-prevention means comprise a ring or collar which is provided on the outside surface of the case wall and which extends in an imaginary plane intersecting the central axis of the tube perpendicularly, and located at an axial position between a downstream end of the spiral-shaped slot and upstream of the bypass openings, while the inside diameter of the respective ring or collar corresponds to the outside diameter of the tube.

15. A cyclone separator according to claim 13, wherein the entry-prevention means comprise a collar, directed radially outwards, around the or each by pass opening.

16. A liquid collecting box provided with a number of cyclones according to claim 10, wherein the liquid collecting box is provided with a liquid discharge duct.

17. A pressure vessel provided with an inlet for a gas/liquid flow and a discharge for gas and a discharge for liquid, while between the inlet and the discharge for gas, a number of liquid collecting boxes according to claim 16 are arranged, while the liquid discharge ducts of the liquid collecting boxes are in communication with the discharge for liquid in the vessel.

* * * * *

UNITED STATES PATENT AND TRADEMARK OFFICE
CERTIFICATE OF CORRECTION

PATENT NO. : 7,381,235 B2  Page 1 of 1
APPLICATION NO. : 10/498853
DATED : June 3, 2008
INVENTOR(S) : Koene et al.

It is certified that error appears in the above-identified patent and that said Letters Patent is hereby corrected as shown below:

In column 4, Line 29, now reads "swirl body 56"
should read --swirl body 5--

Signed and Sealed this

Fourth Day of November, 2008

JON W. DUDAS
*Director of the United States Patent and Trademark Office*